(12) United States Patent
Reiser (10) Patent No.: US 11,796,889 B2
(45) Date of Patent: Oct. 24, 2023

(54) FREQUENCY CONVERSION ARRANGEMENT FOR OPTIMISING PROPERTIES OF A HARMONIC OF A LASER

(71) Applicant: NOVANTA EUROPE GMBH, Wackersdorf (DE)

(72) Inventor: Axel Reiser, Indersdorf (DE)

(73) Assignee: NOVANTA EUROPE GMBH, Wackersdorf (DE)

(*) Notice: Subject to any disclaimer, the term of this patent is extended or adjusted under 35 U.S.C. 154(b) by 0 days.

(21) Appl. No.: 17/764,831

(22) PCT Filed: Nov. 24, 2020

(86) PCT No.: PCT/EP2020/083151
§ 371 (c)(1),
(2) Date: Mar. 29, 2022

(87) PCT Pub. No.: WO2021/105094
PCT Pub. Date: Jun. 3, 2021

(65) Prior Publication Data
US 2022/0317543 A1 Oct. 6, 2022

(30) Foreign Application Priority Data

Nov. 25, 2019 (DE) .......................... 102019131827.0

(51) Int. Cl.
*G02F 1/35* (2006.01)
(52) U.S. Cl.
CPC .......... *G02F 1/3507* (2021.01); *G02F 1/3503* (2021.01); *G02F 1/354* (2021.01); *G02F 1/3505* (2021.01); *G02F 1/3534* (2013.01)
(58) Field of Classification Search
None
See application file for complete search history.

(56) References Cited

U.S. PATENT DOCUMENTS

| 7,920,606 | B2* | 4/2011 | Starodoumov | ....... H01S 3/2316 |
| | | | | 372/6 |
| 8,422,119 | B1 | 4/2013 | Keaton et al. | ................ 359/326 |
| 9,912,114 | B2* | 3/2018 | Leonardo | ............... H01S 3/108 |
| 2003/0043452 | A1* | 3/2003 | Heist | ..................... G02F 1/3534 |
| | | | | 359/326 |

(Continued)

OTHER PUBLICATIONS

Notification Concerning Transmittal of International Preliminary Report on Patentability (Chapter I of the Patent Cooperation Treaty), in English, dated Jun. 9, 2022, which was issued by the International Bureau of WIPO in Applicant's corresponding international PCT application having Serial No. PCT/EP2020/083151, filed on Nov. 24, 2020.

(Continued)

*Primary Examiner* — Rhonda S Peace
(74) *Attorney, Agent, or Firm* — Bodner & O'Rourke, LLP; Gerald T. Bodner; Christian P. Bodner (57) ABSTRACT

The invention relates to a frequency conversion arrangement (100) for optimising properties of a harmonic of a laser, in particular a beam profile and/or a long-term stability, the arrangement comprising:—a first non-linear crystal (X1), which is designed to convert a first wavelength (λ1) partially into a second wavelength (λ2); and—an optical unit, which in particular comprises at least one prism (P), which is designed in such a way as to influence the main axes (x1, y1, x2, y2) of the beam profiles of the first wavelength (λ1) and/or the second wavelength (λ2) differently; and—a second non-linear crystal (X2), which is designed in such a way as to generate a third wavelength (λ3) from the unconverted part of the first wavelength (λ1) and/or the second wavelength (λ2), the second non-linear crystal (X2) having an entry face (A1) and an exit face (A2), and the exit face (A2) running obliquely to the entry face (A1).

24 Claims, 5 Drawing Sheets

(56) References Cited

U.S. PATENT DOCUMENTS

| | | |
|---|---|---|
| 2004/0240491 A1 | 12/2004 | Nebel et al. .................... 372/21 |
| 2010/0150183 A1 | 6/2010 | Starodoumov et al. .......... 372/6 |
| 2017/0299943 A1 | 10/2017 | Leonardo et al. |
| 2018/0034230 A1 | 2/2018 | Leonardo et al. |
| 2019/0129277 A1 | 5/2019 | Zawischa et al. |
| 2022/0317543 A1* | 10/2022 | Reiser ................... G02F 1/3503 |

OTHER PUBLICATIONS

English translation of the International Preliminary Report on Patentability (Chapter I of the Patent Cooperation Treaty), dated May 17, 2022, which was issued by the International Bureau of WIPO in Applicant's corresponding international PCT application having Serial No. PCT/EP2020/083151, filed on Nov. 24, 2020.

Written Opinion of the International Searching Authority, in English, dated Mar. 4, 2021, which was issued by the International Bureau of WIPO in Applicant's corresponding international PCT application having Serial No. PCT/EP2020/083151, filed on Nov. 24, 2020.

International Search Report, in English, dated Mar. 4, 2021, which was issued by the International Bureau of WIPO in Applicant's corresponding international PCT application having Serial No. PCT/EP2020/083151, filed on Nov. 24, 2020.

Office Action (in German), dated Jun. 29, 2021, issued by the German Patent Office for Applicant's corresponding German Patent Application No. DE102019131827.0, filed Nov. 25, 2019.

Office Action (in German), dated Jul. 2, 2020, issued by the German Patent Office for Applicant's corresponding German Patent Application No. DE102019131827.0, filed Nov. 25, 2019.

\* cited by examiner

FREQUENCY CONVERSION ARRANGEMENT FOR OPTIMISING PROPERTIES OF A HARMONIC OF A LASER

The invention relates to a frequency conversion arrangement for optimizing properties of a harmonic of a laser, such as, for example, the beam profile or the long-term stability.

In order to generate a harmonic of a wavelength of a laser system, non-linear crystals are preferably used. Depending on the wavelength of the laser system different crystals having different properties or in different configurations may be employed. Depending on the wavelength range, various crystals with respect to diverse properties are differently well suited for frequency conversion. Most of the crystals, which are eligible for such conversion processes, are commercially available nowadays.

Commercial laser light sources in the near infrared range (NIR), for example, of about 800 nm or 1030 nm, and 1064 nm, respectively, are widely spread nowadays. For many applications, however, wavelengths are desirable, which are outside the mentioned wavelengths. A simple way to attain a harmonic of these laser wavelengths is a frequency conversion in non-linear crystals.

It is known in the state of the art that the third harmonic may be generated, for example, in that a central laser wavelength in a first non-linear crystal is partially frequency-doubled into the second harmonic, and this second harmonic is subsequently converted in a second non-linear crystal having the central wavelength in a sum frequency mixture into the third harmonic. In the case of a central laser wavelength of 1064 nm, the third harmonic is at about 355 nm (triple frequency), i.e., in the ultraviolet (UV) range.

In order to design the respective conversion processes as efficiently as possible, it is known to provide the (optical) entry and exit faces of the crystals to be used with a coating so as to minimize reflection losses. In particular in the UV range it is also known, however, that the coatings of the crystals can result in problems, in particular with respect to long-term stability. Different ageing effects caused by interaction with light, cause the quality of the coating to be degraded in the course of the operating time, which is reflected by a decrease of the beam quality and laser performance when the period of use of the crystals or the laser system is increased.

It is further known to work with focused or relatively small beam bundles in order to obtain a high light intensity to optimize the efficiency of the conversion process. Smaller beam bundles exhibit a higher divergence angle of laser radiation. If the divergence angle of a beam exceeds a certain value (acceptance angle of the non-linear crystal) during a frequency conversion, this may lead to distortions in the beam profile, in particular to elliptical beam profiles of a generated harmonic.

It is further also known that, when certain non-linear crystals are used, a distortion of the beam profile is produced by the so-called "walk-off". This effect is substantially based on the double refraction of the crystals involved and potentially also leads to a degradation of the symmetry of a generated harmonic.

The invention is therefore based on the task to realize a frequency conversion achieving a robust and long-term stable generation of a harmonic and generating a controllable, in particular rotationally symmetrical beam profile of the harmonic at the same time.

According to the invention, this task is solved by a frequency conversion arrangement in accordance with claim 1. Further advantageous embodiments will result from the subclaims.

The task is in particular solved by a frequency conversion arrangement for optimizing properties of a harmonic of a laser, in particular a beam profile and/or a long-term stability, wherein the arrangement comprises:
  a first non-linear crystal, which is designed in such a way as to convert a first wavelength partially into a second wavelength;
  and an optical unit, which in particular comprises at least one prism, which is designed in such a way as to influence the main axes of the beam profiles of the first wavelength and/or the second wavelength differently;
  and a second non-linear crystal, which is designed in such a way as to generate a third wavelength from the unconverted part of the first wavelength and/or the second wavelength, the second non-linear crystal having an entry face and an exit face, and the exit face running obliquely to the entry face.

An essential idea of the invention is to be able to convert a laser beam efficiently into a harmonic having a desired symmetry of the beam profile, in particular to a rotationally symmetric beam profile, by means of the frequency conversion arrangement.

Alternatively, or additionally, reflectance losses can be minimized by the obliquely running exit face of the second non-linear crystal. When the frequency conversion arrangement according to the invention is used, this achieves a high flexibility with respect to the resulting beam profile of the harmonic as well as a high long-term stability with respect to the converted harmonic and a long service life of the crystals used.

In a preferred embodiment, the optical unit comprises at least one prism, which is rotatable about at least one axis so as to influence the respective main axes of the beam profiles differently. This allows in a constructively simple manner that in combination with the obliquely running exit face of the second non-linear crystal, an adjustable, in particular rotationally symmetrical beam profile of the harmonic can be generated. In this case, the material or the refraction angle as well as the apex angle of the prism can be optimized with respect to the crystal properties. In addition, the rotatable mounting of the prism offers one or more degree/s of freedom for adjusting and optimizing the frequency conversion arrangement.

In a preferred embodiment, the prism of the optical unit is transversely translatable so as to adjust and/or compensate for a runtime difference between the first wavelength and the second wavelength continuously. By adjusting the runtime difference, the conversion efficiency can be optimized since the place of generating the harmonic in the second non-linear crystal can be adjusted.

In a preferred embodiment, the second wavelength is the second harmonic of the first wavelength. This may be realized by a single non-linear crystal. Depending on the wavelength range, a series of non-linear crystals such as, e.g., LBO, BBO, KTP, BiBO, etc. is possible for this purpose.

In a preferred embodiment, the third wavelength is a wavelength corresponding to the second harmonic of the first wavelength, or the second harmonic of the second wavelength, or the sum or difference frequency of the first wavelength and/or the second wavelength. In this way, the third harmonic, but also, for example, the fourth harmonic, or the "n-th" harmonic may be generated. Depending on the wavelength range, a series of non-linear crystals such as, e.g., LBO, BBO, KTP, BiBO, etc. is possible for this purpose.

In a preferred embodiment, the exit face of the second non-linear crystal is substantially disposed in a Brewster arrangement, preferably with respect to the third wavelength. In this case, the Brewster arrangement or the Brewster angle can be configured for one of the wavelengths.

In a potential embodiment it is enabled, in particular by using a phase adaptation of type II, to avoid reflectance losses. Specifically, the polarization states of the involved wavelengths behave so that in the second non-linear crystal with respect to the exit face of the second non-linear crystal, the first wavelength vibrates in p pole (parallel polarization), the second wavelength vibrates in s pole (perpendicular polarization), and the third wavelength vibrates in p pole (parallel polarization). This arrangement therefore results in reduced reflectance losses of the first wavelength and the third wavelength when exiting from the second non-linear crystal.

The arrangement using the Brewster angle thus allows to renounce of a coating on the exit face of the second non-linear crystal and to minimize reflectance losses at the same time. In order to achieve a performance loss as small as possible, on the one hand, and no back reflections at the exit face of the second non-linear crystal, on the other hand, since these must be suppressed in a possibly extensive manner. Specifically in the UV range, this is reasonable, since a coating here can degrade under certain circumstances due to continuous exposure. In this case, it is not necessarily required to exactly comply with the Brewster angle of the arrangement. Deviations from certain tolerances are acceptable, which increases the adjustment and production tolerance of the frequency conversion arrangement. This may be understood such that a tolerance range of the deviation from the Brewster angle of, e.g., ±1° to ±5° may be designed and certainly even be desired in some cases.

In a potential embodiment, the first non-linear crystal is formed as a plane-parallel crystal. Plane-parallel means here that the entry and exit faces of the first non-linear crystal substantially run in parallel to one another. This has the advantage, on the one hand, that plane-parallel crystals are simpler to manufacture and therefore more cost-efficient. On the other hand, this enables always substantially perpendicular angles of incidence onto the entry faces of the first and second non-linear crystals.

In contrast to approaches, in which a crystal at the entry face is intersected and/or arranged at an angle—for example at the Brewster angle—the plane-parallel formation of the (first) crystal and/or the angle of incidence onto the second crystal offers the advantage that even unpolarized light is applicable—for example in the case of fiber lasers without guidance of polarization. For the case of unpolarized light, such obliquely running entry faces would require a laborious and complex AR coating in order to be able to transmit as loss-free as possible, which is thus omitted. In total, an efficient arrangement is thus enabled.

In a preferred embodiment, the optical unit is coordinated, in particular by an apex angle and a material of the prism, to the obliquely running exit face of the second non-linear crystal, such as to generate a rotationally symmetrical beam profile for the third wavelength, in particular independent of the symmetry of the beam profile of the first wavelength and/or the second wavelength.

Thus, it is enabled in a constructively simple manner that in combination with the obliquely running exit face of the second non-linear crystal, an adjustable, in particular rotationally symmetrical beam profile of the harmonic can be generated by compressing the beam profile in a targeted manner. The material of the prism may in this case consist, for example, of fused silica or other laser-resistant glasses and/or crystals.

In a preferred embodiment, the exit face of the second non-linear crystal is uncoated. This has the advantage that a coating can be renounced of, since the quality and properties of a coating can degrade by interaction with one of the wavelengths—this is especially problematic for wavelengths produced in the UV range. In the UV range, the problem is known that the produced UV light especially at high performances changes the properties of the coating by interaction with the light, since a degradation of the coating has an influence on the long-term stability, the beam profile and scattered light. It is therefore advantageous to renounce of the coating of the non-linear crystals.

The frequency conversion arrangement according to the invention allows to renounce of the coating, in particular of the exit face of the second non-linear crystal and nevertheless to achieve excellent reflection-suppressing properties. In addition, an uncoated crystal or a partially coated crystal (for example, only the entry face is coated) is more cost-efficient than a coated crystal since the coating processes for a coating for suppressing reflections of several wavelengths, in particular simultaneously, are laborious and therefore expensive.

In an alternative embodiment, the exit face of the second non-linear crystal is coated, preferably with an antireflection coating for the first wavelength and/or the second wavelength and/or the third wavelength and/or a p coating. The coating may be selected such that, for example, the Brewster arrangement is selected for a first wavelength, in which a coating is very laborious, expensive and problematic with respect to the performance of the arrangement as described above. The reflection of this wavelength is suppressed by the Brewster arrangement. Since the further wavelengths, however, can generate (partially strong) reflections on the obliquely running exit face of the second non-linear crystal, it is possible to apply a coating for these wavelengths on the obliquely running exit face of the second non-linear crystal.

In this case, the long-term stability and the beam profile quality of the frequency conversion arrangement are not disturbed, but all of the reflections of the involved wavelengths are suppressed at the same time. This has the consequence of an optimum efficiency of the frequency conversion. Moreover, it is not necessary to suppress back reflections in the setup of great cost. A p coating can protect a crystal from external influences such as air humidity, ozone or the like. In a potential embodiment, all or several of the crystal top surfaces, if necessary, including an envelope surface (i.e., outer surface) of a crystal, have an antireflection coating and/or a p coating.

In one embodiment, the exit face of the second non-linear crystal may also be coated for all of the involved wavelengths. For example, in a case where all of the wavelengths are in one range, which is sufficiently uncritical for the problems described above with respect to degrading the coating.

In a preferred embodiment, the exit face of the second non-linear crystal is nanostructured. This enables a very broadband reflection suppression to be provided for all of the involved or selected wavelengths, which is moreover very stable with respect to interaction with light.

In particular, the task according to the invention is also solved by a system for the frequency conversion of a laser, wherein the system comprises the following:

a frequency conversion arrangement according to at least one of the preceding claims;

a laser system generating a beam having a first wavelength; and a beam profile size adaptation unit, which is designed such as to adapt the size of a beam profile;

wherein the beam profile, after the adaptation of the size by the beam profile size adaptation unit, is supplied to the frequency conversion arrangement.

The same advantages result therefrom as already described in conjunction with the frequency conversion arrangement. In addition, the beam profile size adaptation unit allows the size of the beam profile of the laser system to be adapted. This enables a flexibility with respect to the beam profile size, and directly as a result, flexibility of the used intensity of the light of the laser system. This results in a potential optimization of the efficiency of frequency conversion. The beam profile size adaptation unit, for example, may be a telescope and/or a single lens and/or lens array and/or a reflector telescope and/or one or more parabolic or curved mirror/s.

In one embodiment, the system comprises a beam profile analysis unit for measuring the dimensions of the respective main axes of the respective beam profile of the first wavelength and/or the second wavelength and/or the third wavelength, wherein the beam profile analysis unit in particular comprises at least one camera and/or an $M^2$ analysis unit. It is enabled in this way to optimize the beam profiles of one or more wavelength/s to their respective geometries. The beam profile analysis unit, for example, allows a rotationally symmetrical beam profile of the third wavelength to be generated in a controlled manner.

It is further also possible for special applications to deliberately generate a beam profile having a defined ratio of two main axes, such as, for example, an elongated beam profile of the third wavelength having a main axes ratio of 1:2.

By means of the beam profile analysis unit it is further possible to also measure and analyze the beam profiles of the further (first and second) wavelengths in a controlled manner. In one embodiment, automated elements, for example, one or more crystal holder/s or optic holder/s having piezo motors for tilting and/or rotating the crystals or optical units, the frequency conversion arrangement or the beam profile size adaptation unit are set into contact with the beam profile analysis unit, for example, via a computer. This enables certain values to be actively regulated in advance such as, for example, the dimensions of the main axes of the beam of the third wavelength.

In one embodiment, the size of the beam profile of the beam before the frequency conversion arrangement has a diameter of at least 250 μm, preferably at least 500 μm, further preferred at least 1,000 μm. The selection of a small diameter of the beam of the lases system allows even relatively low light performances to be converted efficiently.

In an alternative embodiment, a size of the beam profile before the frequency conversion arrangement of smaller than 250 μm can be used. Depending on the wavelength range and/or crystal or crystal type, a size of the beam profile may be 100 μm or smaller.

In one embodiment, the laser system is a pulsed laser system, preferably having pulse durations in the microsecond range, further preferred in the nanosecond range, still further preferred in the picosecond range. A pulsed laser system allows high (peak) intensities to be reached and thus the efficiency of the frequency conversion to be optimized.

In an alternative embodiment, the laser system may also have pulse durations in the femtosecond range.

In an alternative embodiment, the laser system is a continuous beam laser system. This allows the system to be used for applications, in which a pulsed light source is neither desired nor existent.

In an alternative embodiment, the system comprises a third non-linear crystal for the frequency conversion of the third wavelength into a fourth wavelength. In this case, the third wavelength can be converted alone or alternatively in interaction with the first wavelength or the second wavelength into a fourth wavelength.

In a further alternative embodiment, the system comprises a second frequency conversion arrangement for converting one or more of the involved wavelengths into a fourth and a fifth wavelength.

The task according to the invention is in particular solved by a frequency conversion method for optimizing properties of a harmonic of a laser, in particular a beam profile and/or long-term stability, wherein the method comprises the following steps:

a first conversion step, in which a first wavelength ($\lambda 1$) is partially converted into a second wavelength ($\lambda 2$) in a first non-linear crystal (X1);

a beam profile adaptation step, in which the beam profiles of the first wavelength ($\lambda 1$) and/or the second wavelength ($\lambda 2$) are influenced in their respective main axes (x1, y1, x2, y2) differently;

a second conversion step, in which a third wavelength ($\lambda 3$) is generated from the non-converted part of the first wavelength ($\lambda 1$) and/or the second wavelength ($\lambda 2$) in a second non-linear crystal (X2), wherein the second non-linear crystal (X2) has an entry face ($\lambda 1$) and an exit face ($\lambda 2$), and the exit face ($\lambda 2$) running obliquely to the entry face ($\lambda 1$).

From this, the same or similar advantages result as already described in conjunction with the frequency conversion arrangement and/or the system for the frequency conversion of a laser.

In one embodiment, the beam profile adaptation step of the frequency conversion method is performed by rotating a prism about at least one axis.

This allows in a constructively simple manner that in combination with the obliquely running exit face of the second non-linear crystal, a continuously adjustable, in particular rotationally symmetrical or compressed beam profile of the third wavelength can be generated. In this case, the material or the refraction index as well as the apex angle of the prism can be optimized with respect to the crystal properties of the second non-linear crystal. In addition, the rotatable mounting of the prism offers one or more degrees of freedom for adjusting and optimizing the frequency conversion arrangement.

In one embodiment, the aspect ratio of the beam of the third wavelength is continuously adjustable by the beam profile adaptation step. Thereby, it is enabled, on the one hand, to compensate for a distortion of the beam profile (for example, caused by walk-off). On the other hand, this also provides the possibility to select the beam profile of the third wavelength arbitrarily (or adapted to an experiment)—for example, in a main axis ratio (aspect ratio) of 1:3 or 1:2.

In one embodiment, the frequency conversion method comprises a step for adjusting an intensity of a portion of the first wavelength involved in the first and/or second conversion step.

Basically, the conversion efficiency in generating the third wavelength in the second non-linear crystal depends on the intensity and/or the mixing ratio of the involved first wavelength and the involved second wavelength. Ideally, the mixing ratio (of the intensities) is approximately 1/3:2/3 (first wavelength to second wavelength), which can correspond to a theoretical (conversion) efficiency of up to 100%.

Since the involved beams (of the first wavelength and the second wavelength) preponderantly have a Gaussian intensity profile, a deformation of the Gaussian intensity profile of the first wavelength caused after frequency doubling in the first non-linear crystal due to the conversion. This deformation yields a disadvantage for the conversion efficiency in the subsequent second conversion step in the second non-linear crystal. Furthermore, this deformation may have a negative effect on the beam quality of the third wavelength—the beam of the third wavelength can thereby achieve poor $M^2$ values, for example.

In order to avoid this, a conversion efficiency in the first non-linear crystal may be selected to be "not optimal" (i.e., deliberately not maximum conversion efficiency) so as to optimize the beam quality of the involved wavelengths. This may be performed in a potential embodiment by adapting the polarization/s by means of at least one L/2 wave plate.

The method according to the invention may further comprise additional method steps as those already explained in conjunction with the frequency conversion arrangement according to the invention and/or in conjunction with the system according to the invention for the frequency conversion of a laser.

The invention will be described below also with respect to further features and advantages according to the invention on the basis of exemplary embodiments which will be explained in greater detail by means of the illustrations.

Shown are in.

Figure 1A:
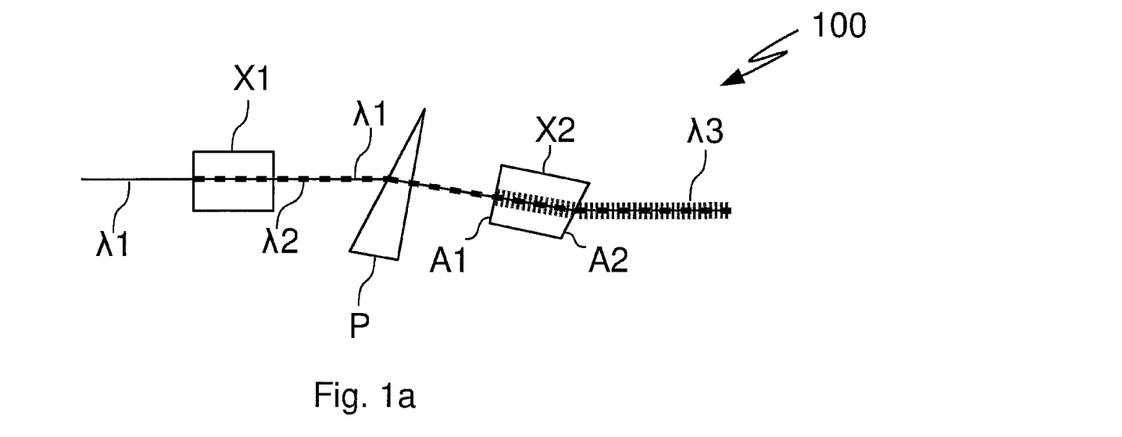
FIG. 1a a schematic representation of a first exemplary embodiment of the frequency conversion arrangement, in which the optical unit is disposed between a first non-linear crystal and a second non-linear crystal.

In FIG. 1a, a frequency conversion arrangement 100 according to the invention is schematically represented. A first beam of a first wavelength λ1 provided for frequency conversion propagates in the horizontal direction from the left to the right. As long as not explicitly stated otherwise, it is always assumed in the following that all of the beams represented in the corresponding following Figures coming from the left propagate to the right.

The first wavelength λ1 is frequency-converted in a first non-linear crystal X1. In a first exemplary embodiment, the first wavelength λ1 is frequency-doubled in the first non-linear crystal X1. A crystal type for this exemplary embodiment having such a frequency conversion may be an LBO crystal or a BBO crystal, for example. Further crystals designed for frequency conversion are familiar to the person skilled in the art.

The first non-linear crystal X1 can be designed for a critical or non-critical phase adaptation for frequency conversion. The first non-linear crystal X1 is mounted in a holder (not shown) designed for this purpose, which preferably allows the first non-linear crystal X1 to be tilted in different directions. The tilting may be performed manually, for example, by fine thread screws, or automatically or controlled, for example, by piezo (step) motors.

It is further possible for the holder of the first non-linear crystal X1 to be heatable or temperature-controllable.

After the frequency conversion in the first non-linear crystal, the beam of the first wavelength λ1 and the second beam generated by the frequency conversion and having a second wavelength λ2 propagate in a substantially collinear manner. In the exemplary embodiment, in which frequency-doubling is performed by the first non-linear crystal X1, the second wavelength λ2 substantially corresponds to half of the wavelength of the first wavelength λ1.

In one exemplary embodiment, the first non-linear crystal has a coating on its entry face and its exit face, so as to suppress reflections of the first wavelength λ1 (at the entry face and the exit face) and of the second wavelength λ2 (at the exit face).

In one exemplary embodiment of the frequency conversion arrangement 100 in FIG. 1a, a prism P forms the optical unit according to the invention. In alternative exemplary embodiments, the optical unit may comprise further optical systems. In a further alternative exemplary embodiment, the optical unit is formed by an (anamorphic) prism pair.

The prism P in the exemplary embodiment in FIG. 1a is mounted such as to be continuously translatable along an axis in parallel to the prism P. Furthermore, the prism P is mounted in such a manner that it can be continuously rotated in a plane in parallel to the beams of the first wavelength λ1 and the second wavelength λ2.

Moving and/or rotating of the prism or the optical unit may be performed manually, for example, by fine thread screws, or automatically or controlled, for example, by piezo (step) motors.

By means of the prism, the beam profile diameters of the beams of the first wavelength λ1 and the second wavelength λ2 may be influenced in a plane in parallel to the propagation direction of the beams along a respective main axis of the respective beam profile, whereas the beam profile diameters substantially remain unchanged in a plane perpendicular to the propagation direction. Rotating the prism allows the aspect ratio between the two main axes to be adapted. The adaptation of the aspect ratio will be described below in FIG. 2.

In addition, it is also possible for the prism P to be mounted such that also one or more rotating or tilting directions are provided. Thus, a further optimizing parameter may be formed, for example, by rotating the prism P about an axis in parallel to the propagation direction of an input beam of the first wavelength λ1 and/or the second wavelength λ2.

Alternatively, or additionally, the prism P can also be tilted about an axis in parallel to the entry face of the prism P and/or the exit face of the prism P.

The beams of the first wavelength λ1 and the second wavelength λ2 propagate after the prism P at an angle to the (original) direction of incidence of the two beams. The angle is independent of the material of the prism P, the apex angle of the prism P, the twisting of the prism P and the first wavelength λ1 and the second wavelength λ2.

After the adaptation of the aspect ratio of the beam profiles of the beams of the first wavelength λ1 and the second wavelength λ2 along their respective main axes, the beams propagate through the second non-linear crystal X2. In the second non-linear crystal X2, the first wavelength λ1 and the second wavelength λ2 together are frequency-converted so as to generate the third wavelength λ3.

In the exemplary embodiment, a sum frequency of the two input wavelengths λ1 and λ2 is formed in the second non-linear crystal. A crystal type for this exemplary embodiment having such a frequency conversion may be an LBO or a BBO, for example. Further crystals designed for frequency conversion are familiar to the person skilled in the art. The second non-linear crystal X2 can be designed for a critical or non-critical phase adaptation for frequency conversion. The second non-linear crystal X2 is mounted in a holder (not shown) designed for this purpose, which preferably allows the second non-linear crystal X2 to be tilted in several directions.

The tilting may be performed manually, for example, by fine thread screws, or automatically or controlled, for example, by piezo (step) motors. It is further possible for the holder of the second non-linear crystal X2 to be heatable or temperature-controllable. In alternative exemplary embodiments, a difference frequency of the first wavelength λ1 and the second wavelength λ2 may also be formed in the second non-linear crystal X2. In further alternative exemplary embodiments, the second wavelength λ2 can be frequency-doubled in the second non-linear crystal X2.

The first non-linear crystal X1 is formed as a plane-parallel crystal.

Plane-parallel means here that the entry and exit faces of the first non-linear crystal X1 substantially run in parallel to one another.

The prism P and the second non-linear crystal X2 are disposed and formed such that always a substantially perpendicular angle of incidence onto the entry face A1 of the second non-linear crystal X2 is the result.

In total, respectively substantially angles of incidence onto the entry faces of the first and the second non-linear crystals X1, X2 are the result in this arrangement. Wherein substantially perpendicular is understood to be a range from about 0° to 10°.

In contrast to approaches, where a crystal is intersected at an angle—for example, at the Brewster angle—and/or is disposed, the plane-parallel formation of the (first) crystal and/or the angle of incidence onto the second crystal offers the advantage that even unpolarized light—for example, in fiber lasers without polarization control—can be used. In the case of unpolarized light, such obliquely running entry faces would need a laborious and complex AR coating so as to be able to transmit in a loss-free manner, which coating thus is omitted.

In FIG. 1a, the entry face A1 of the second non-linear crystal X2 is substantially perpendicular to the propagation direction of the first beam of the first wavelength λ1 and/or the second beam of the second wavelength λ2. The exit face A2 of the second non-linear crystal X2 is formed at an angle to the entry face A1 of the second non-linear crystal X2.

In the exemplary embodiment, the exit face A2 of the second non-linear crystal X2 is formed such that it forms a Brewster arrangement with the propagation direction of the beam of the third wavelength λ3 generated in the second non-linear crystal X2. A Brewster arrangement means here that the beam of the third wavelength λ3 impinges substantially at the Brewster angle onto the exit face A2 (respectively the corresponding solder of the exit face A2) of the second non-linear crystal X2. This configuration enables a reflection of the third wavelength λ3 to be suppressed at the exit face A2 of the second non-linear crystal X2. This offers the possibility to renounce of a coating on the exit face A2 of the second non-linear crystal X2.

Nevertheless, the entry face A1 of the second non-linear crystal X2 can be coated, namely, for example, with an antireflection coating for the first wavelength λ1 and the second wavelength λ2 so as to avoid reflections at the entry face A1 of the second non-linear crystal X2.

In an alternative embodiment, it is also possible for the exit face A2 of the second non-linear crystal X2 to have a coating, for example. The crystal may have a coating for the first wavelength λ1 and the second wavelength λ2 on the exit face A2.

The constructive adaptation of the prism P and the apex angle of the prism P to the Brewster arrangement of the exit face A2 of the second non-linear crystal X2 enables in a simple manner that an adjustable, in particular rotationally symmetrical beam profile of the third wavelength λ3 can be generated. By tilting the prism P, an "arbitrary" symmetry of the beam profile may also be generated. "Arbitrary symmetry" is to be understood here as an adjustable relationship of a horizontal and a vertical axis of the beam profile of the third wavelength λ3.

Figure 1B:
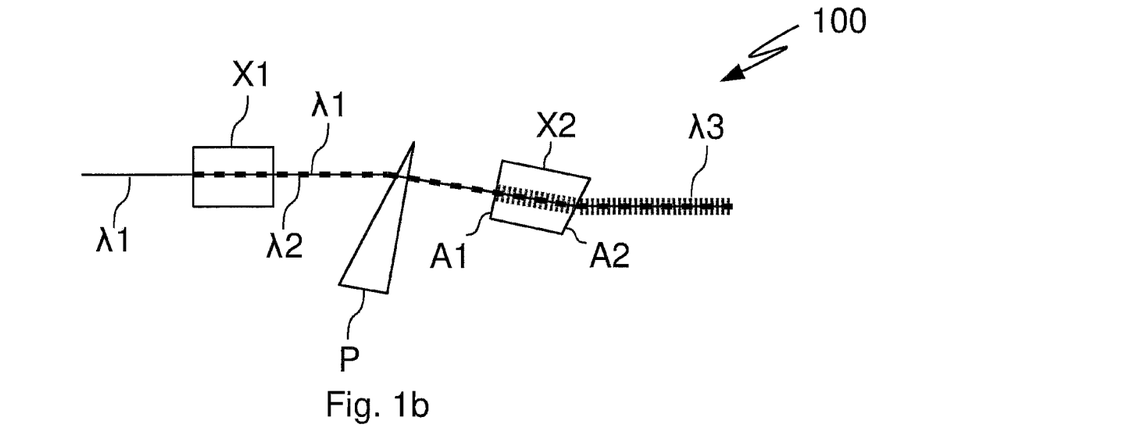
FIG. 1b a schematic representation of the first exemplary embodiment of the frequency conversion arrangement of FIG. 1a, in which the optical unit is disposed between a first non-linear crystal and a second non-linear crystal in a modified manner.

In FIG. 1b, an exemplary embodiment in analogy to FIG. 1a is shown with the difference that the position of the prism P is modified as described before. By such a translation of the prism P, a runtime difference of the first wavelength λ1 and the second wavelength λ2 can be adjusted or compensated for.

Runtime difference here means that a time of incidence of the first wavelength λ1 and the second wavelength λ2 onto the prism P is different since different wavelengths propagate through the material at different speeds. Thus, in this case at different speeds through the first non-linear crystal X1 and the medium (for example, air) between the first non-linear crystal X1 and the prism P. The dispersive property of the prism P allows this runtime difference to be adjusted or compensated for or overcompensated by translating the prism P, since the first wavelength λ1 and the second wavelength λ2 run through different optical paths through the prism P.

Translating the prism P thus allows effectively the place of origin of the third wavelength λ3 within the second non-linear crystal X2 to be varied. Thus, the efficiency of the frequency conversion can be adjusted in that the maximum potential crystal length is utilized for the frequency conversion.

Figure 2:
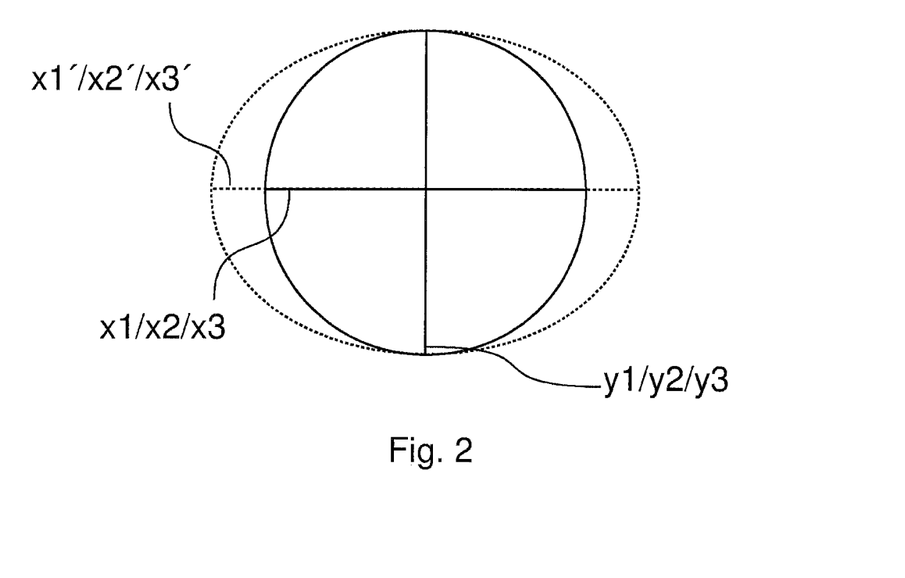
FIG. 2 a schematic representation of a beam profile of a beam of wavelength involved in a frequency conversion by means of the frequency conversion arrangement.

In FIG. 2, the effect of the optical unit on a beam profile is illustrated. The continuous circle line in FIG. 2 describes a beam profile before it has been influenced by the optical unit. In this case, a main axis x1, x2, x3 preferably corresponds to a horizontal main axis of the first or the second or the third wavelength.

A main axis being perpendicular to x1, x2, x3 is designated with y1, y2, y3, and is preferably a vertical main axis of the corresponding beam profile of the first or the second or the third wavelength. The optical unit according to the invention now can influence a beam in that—depending on the orientation of the optical unit—a main axis x1, x2, x3 of a beam profile is influenced, whereas the main axis y1, y2, y3 formed perpendicular thereto remains unchanged. This case of an influenced beam profile is illustrated in FIG. 2 by a dotted line. The influenced axis here is designated with x1', x2', x3'. Each of the three reference numerals per main axis are intended to illustrate that the optical unit influences the first wavelength and/or the second wavelength and/or the third wavelength substantially in an equal manner, as soon as one (or more) of these wavelengths propagates/propagate through the optical unit.

Rotating the optical unit about an axis in parallel to the direction of the first wavelength influences the aspect ratio of the involved wavelength(s).

Figure 3:
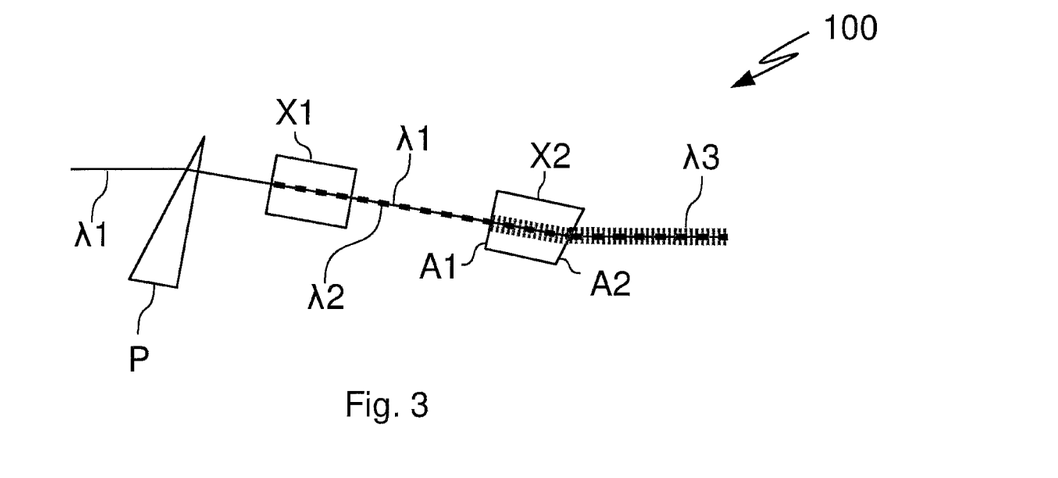
FIG. 3 a schematic representation of a second exemplary embodiment of the frequency conversion arrangement, in which the optical unit is disposed between a first non-linear crystal and a second non-linear crystal.

An alternative exemplary embodiment of the frequency conversion arrangement 100 according to the invention is schematically illustrated in FIG. 3. In FIG. 3, the same reference numerals are used for the same beams or elements as in the previously described Figures.

In this exemplary embodiment, the optical unit is formed by a prism P located in front of a first non-linear crystal X1. This exemplary embodiment enables a beam of the third wavelength having a desired symmetry—thus, a desired aspect ratio of the main axes—to be generated. For this purpose, the prism P is rotated about an axis in parallel to an axis specified by the propagation direction of the first wavelength λ1.

Rotating the prism P allows for one or more effects to occur in the first non-linear crystal X1 and/or the second non-linear crystal X2, which one or more effect/s also influence/s the beam profile of the third wavelength to be compensated for so as to preferably generate a rotationally symmetrical beam profile in case of the third wavelength λ3. In this case, for example, effects like a walk-off of the second wavelength λ2 and/or the third wavelength λ3 and/or exceeding an acceptance angle in the first non-linear crystal X1 and/or in the second non-linear crystal X2 can be compensated for.

The first non-linear crystal X1 is formed as a plane-parallel crystal.

Plane-parallel means here that the entry and exit faces of the first non-linear crystal substantially run in parallel to one another.

The prism P and the second non-linear crystal X2 are disposed and formed such that a substantially perpendicular angle of incidence onto the entry face A1 of the second non-linear crystal X2 is always the result.

In total, respectively substantially perpendicular angles of incidence onto the entry faces of the first and the second non-linear crystals X1, X2 are the result in this arrangement. Wherein substantially perpendicular is understood to be a range from about 0° to 10°.

In contrast to approaches, in which a crystal at the entry face is intersected and/or arranged at an angle—for example at the Brewster angle—the plane-parallel formation of the (first) crystal offers the advantage that even unpolarized light is applicable—for example in the case of fiber lasers without guidance of polarization. For the case of unpolarized light, such obliquely running entry faces would require a laborious and complex AR coating in order to be able to transmit as loss-free as possible, which is thus omitted.

Figure 6:
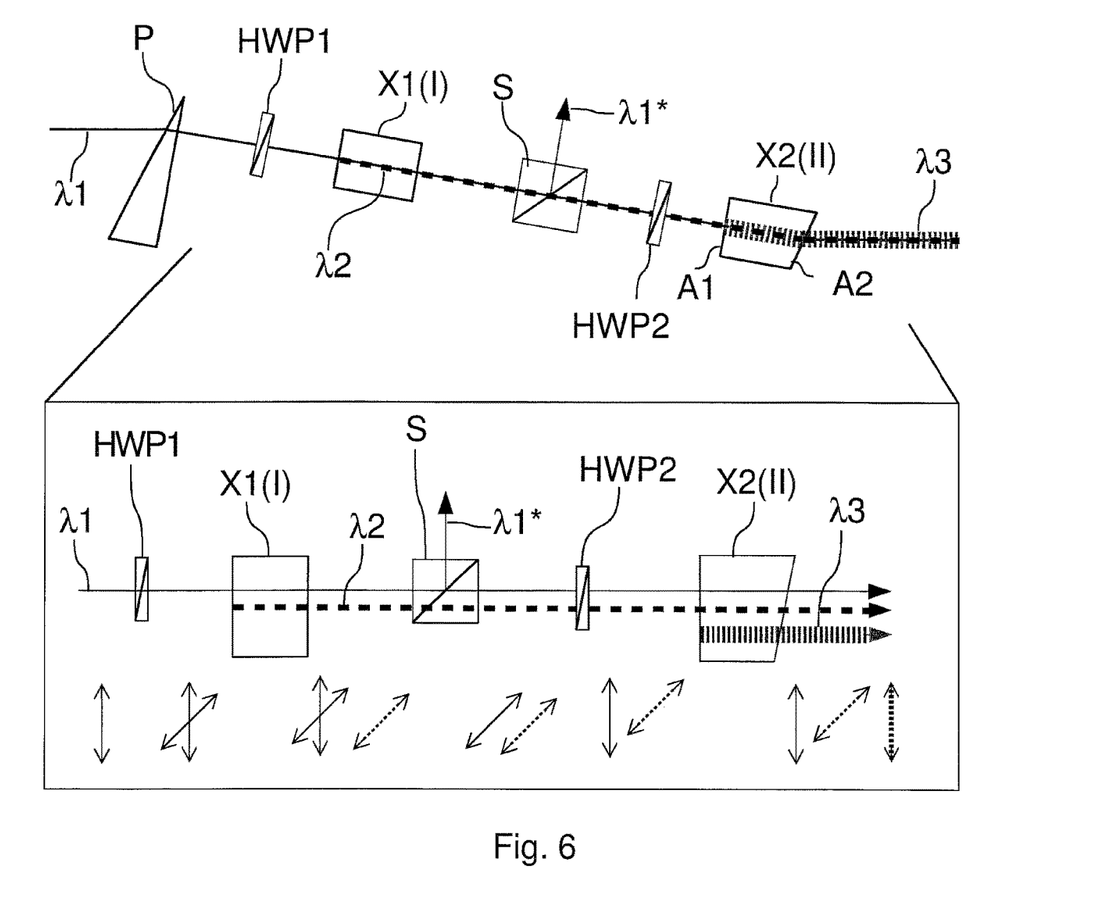
FIG. 6 a schematic representation of an exemplary embodiment of the frequency conversion arrangement for a frequency conversion of type II having an optimized portion of the first wavelength.
Figure 7:
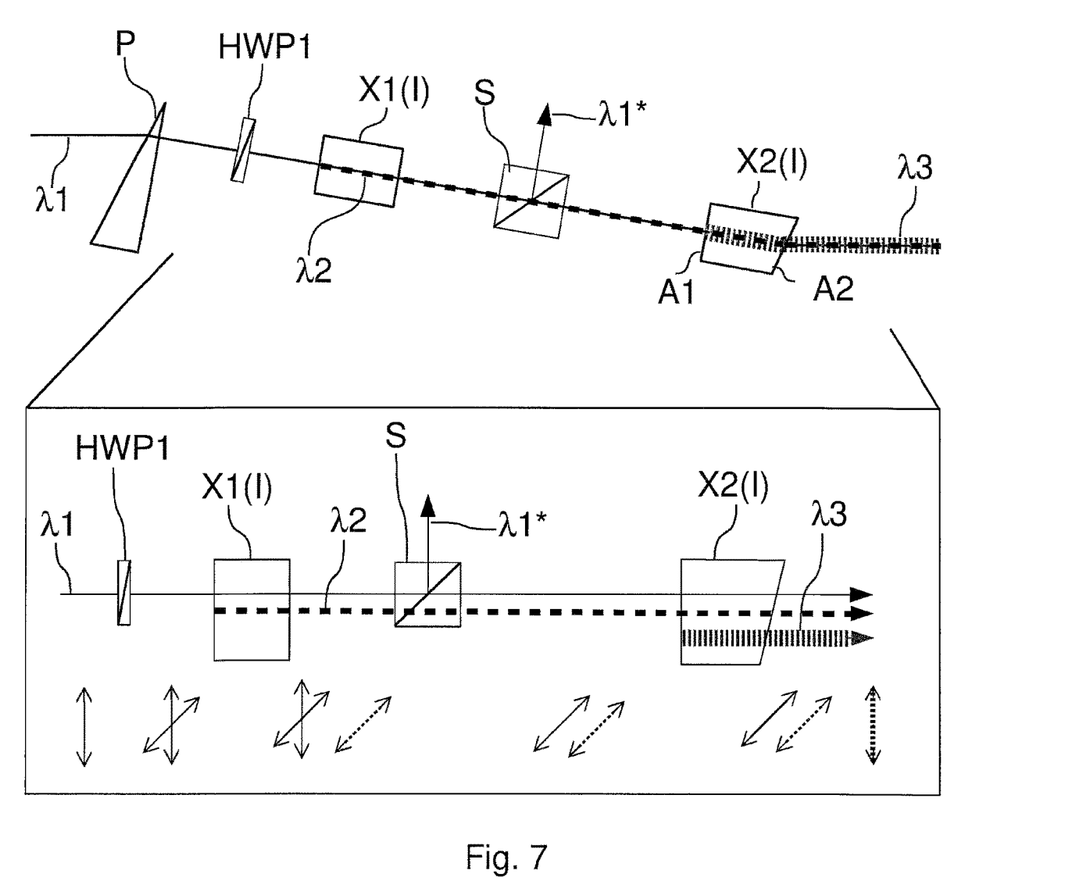
FIG. 7 a schematic representation of an exemplary embodiment of the frequency conversion arrangement for a frequency conversion of type I having an optimized portion of the first wavelength.

For the same reasons, a plane-parallel entry face is also better suited for superimposed polarization conditions—cf. the following exemplary embodiments in conjunction with FIG. 6 and FIG. 7.

The exit face of the second non-linear crystal X2 is formed in FIG. 3, in analogy to the exemplary embodiment of FIG. 1a and FIG. 1b, substantially in a Brewster arrangement, preferably with respect to the third wavelength λ3, so as to minimize reflection losses for the third wavelength. In an alternative exemplary embodiment, the arrangement of the exit face A2 of the second non-linear crystal X2 may also deviate from the described Brewster arrangement.

Figure 4:
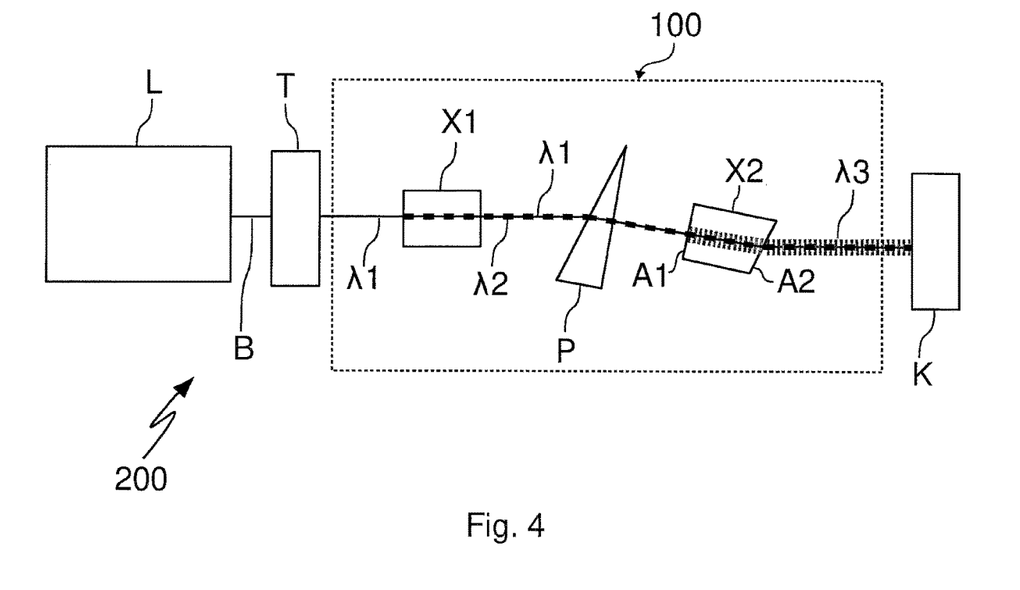
FIG. 4 a schematic representation of an exemplary embodiment of the system for frequency conversion.

In FIG. 4, an exemplary embodiment of a system for frequency conversion 200 is schematically illustrated. In the exemplary embodiment, the system for frequency conversion 200 comprises a frequency conversion arrangement 100 according to the invention, as described before. In FIG. 4, identical reference numerals as in the previously described Figures are used for the elements of the frequency conversion arrangement 100. The system of the exemplary embodiment in FIG. 4 furthermore comprises a laser system L providing a beam B at the first wavelength λ1 for being supplied to the frequency conversion arrangement 100. Before the beam B is supplied to the frequency conversion arrangement 100, a size of the beam profile of beam B can be influenced by a beam profile size adaptation unit T. In one exemplary embodiment, it is, for example, possible for the beam profile size adaptation unit to comprise a telescope which adjusts the size of the beam profile to a size of 250 µm. It is further possible in an alternative exemplary embodiment for the beam profile size adaptation unit to be provided by a single lens which adjusts the size of the beam profile of beam B at one place, for example, between a first non-linear crystal X1 and a second non-linear crystal X2.

Figure 5:
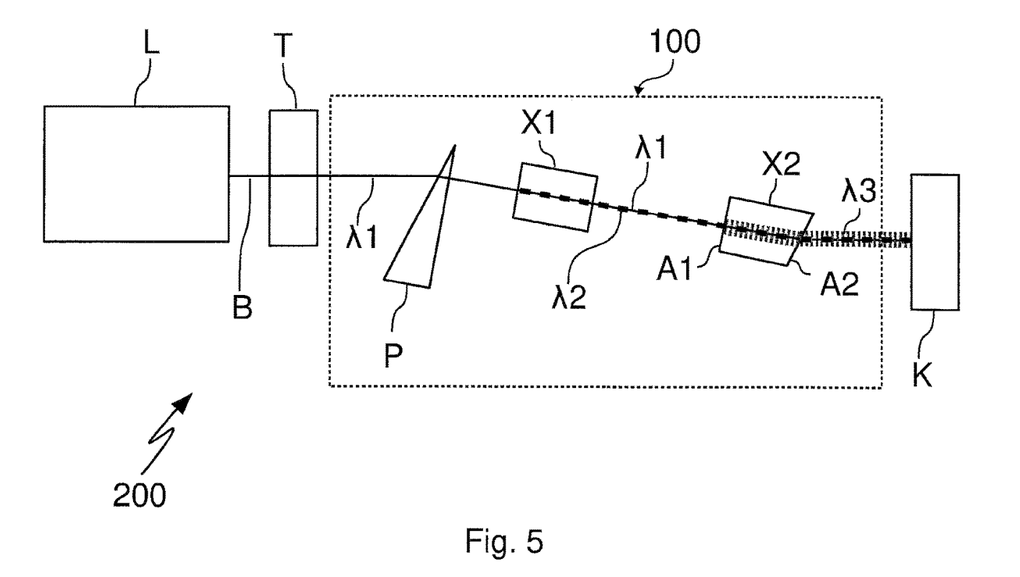
FIG. 5 a schematic representation of a further exemplary embodiment of the system for frequency conversion.

In FIG. 5, a further exemplary embodiment of a system for frequency conversion 200 is schematically illustrated. The system for frequency conversion 200 in the exemplary embodiment comprises a frequency conversion arrangement 100 as previously described in conjunction with FIG. 3. So, it is possible in the system 200 to adjust an aspect ratio of the beam profile of the first wavelength as previously described.

In FIG. 5, identical reference numerals as in the previously described Figures are used for the elements of the frequency conversion arrangement 100.

The system of the exemplary embodiment in FIG. 5 furthermore comprises a laser system L providing a beam B at the first wavelength λ1 for being supplied to the frequency conversion arrangement 100. Before the beam B is supplied to the frequency conversion arrangement 100, a size of the beam profile of beam B can be influenced by a beam profile size adaptation unit T. In one exemplary embodiment, it is, for example, possible for the beam profile size adaptation unit to comprise a telescope which adjusts the size of the beam profile to a size of 250 µm.

It is further possible in an alternative exemplary embodiment for the beam profile size adaptation unit to be provided by a single lens which adjusts the size of the beam profile of beam B at one place, for example, between a first non-linear crystal X1 and a second non-linear crystal X2.

The beam profile analysis unit K in the exemplary embodiment of FIG. 4 and FIG. 5 serves the purpose of analyzing the dimensions of the main axes x1, x2, x3, x1', x2', x3' and/or y1, y2, y3 of the first and/or second and/or third wavelength and/or the quality of the beam profiles.

This is formed by a camera and or an $M^2$ analysis unit. A single wavelength may be analyzed by using optical filters, for example.

Alternatively, or additionally, it is also possible for the beam profile analysis unit to comprise further portions such as, for example, a spectrometer and/or a power meter so as to detect the spectral properties and the performance of the (individual) wavelengths.

In one exemplary embodiment, the parameters detected by the beam profile analysis unit are evaluated by means of a computer, and in this case a long-term stability of one or more parameters is detected, for example. The parameters detected in this case may also be utilized to integrate single portions such as crystal holders and/or the optical unit and/or the beam profile analysis unit electronically into a control circuit in order to regulate to one or more parameters such as preferably a long-term stability of the third wavelength.

The exemplary embodiments of FIG. 4 and FIG. 5 may also comprise further portions (not shown in FIG. 4 and FIG. 5). For long beam paths, for example, between the laser system L and beam profile size adaptation unit T and/or between the beam profile size adaptation unit T and the frequency conversion arrangement 100 and/or between the first non-linear crystal X1 and the second non-linear crystal X2, several deflection mirrors deflecting one or more beams may be present.

Furthermore, the entire system for frequency conversion 200 or parts thereof, for example, the frequency conversion arrangement 100, may be accommodated in a housing—to be transportable and/or to be evacuated and/or to be rinsed or flooded with a gas, for example.

On the basis of FIG. 6, a further exemplary embodiment of the present invention will be described below.

In the described exemplary embodiment of the frequency conversion arrangement according to FIG. 6, frequency tripling (third-harmonic generation, THG) for generating the third harmonic (third wavelength, $\lambda 3$) is described.

Basically, the conversion efficiency in generating the third harmonic in the second non-linear crystal (THG crystal) is dependent on the intensity and/or the mixing ratio of the involved first wavelength $\lambda 1$ and the second wavelength $\lambda 2$. Typically, the mixing ratio (of the intensities) is about ⅓:⅔ (first wavelength to second wavelength), which can correspond to a theoretical (conversion) efficiency of up to 100%. But an (ideal) mixing ratio depends on many parameters such as the performance and/or the intensity of the involved wavelengths or crystal parameters, and the used wavelength (ranges), respectively, so that no exact value can be indicated for an (ideal) mixing ratio.

Since the involved beams (of the first wavelength and the second wavelength) preponderantly have a Gaussian intensity profile, the conversion causes a deformation of the Gaussian intensity profile of the first wavelength $\lambda 1$ after the frequency doubling in the first non-linear crystal. This deformation yields a disadvantage for the conversion efficiency in the subsequent sum frequency in the second non-linear crystal. Further, this deformation can have a negative effect of the beam quality of the third wavelength $\lambda 3$—the beam of the third wavelength can thereby obtain poor $M^2$ values, for example.

In order to avoid this, a first conversion efficiency in the first non-linear crystal may be selected to be "not optimal" (i.e., deliberately not maximum conversion efficiency) so as to optimize the beam quality of the involved wavelengths, in particular the beam profile of the third wavelength and/or to thereby improve the efficiency of the conversion into the third wavelength.

For this purpose, the frequency conversion arrangement in FIG. 6 comprises a first $\lambda/2$ wave plate HWP1 disposed in front of the first non-linear crystal X1(I).

The first wave plate HWP1 is designed to generate a superimposed polarization condition of a vertical and horizontal polarization for the first wavelength $\lambda 1$.

In the exemplary embodiment, the first wavelength $\lambda 1$ is initially polarized vertically.

This polarization condition as well as the further polarization conditions in the course through the frequency conversion arrangement are illustrated in FIG. 6 below by corresponding arrows.

The first wavelength $\lambda 1$ or the vertically polarized portion (of the superimposed polarization condition) of the first wavelength $\lambda 1$ is frequency-doubled into the first non-linear crystal X1(I) into the second wavelength $\lambda 2$.

The first non-linear crystal X1(I) here is a crystal of type I. The first non-linear crystal X1(I) is a plane-parallel crystal. Plane-parallel means here that the entry and exit faces of the crystal substantially run in parallel to one another.

As described before, the converted portion (the portion involved in the conversion) of the first wavelength $\lambda 1$ experiences a deformation in the corresponding intensity profile. Therefore, the converted portion is only restrictedly suitable for a subsequent mixing process (in this case the generation of the third harmonic). According to this exemplary embodiment, the converted portion should therefore not be used for generating the third harmonic in the second non-linear crystal X2(II).

Instead, the unconverted portion of the first wavelength $\lambda 1$—the portion of the first wavelength not involved in the conversion into the second wavelength $\lambda 2$—should be used for generating the third wavelength $\lambda 3$.

The second non-linear crystal X2(II) here is a crystal of type II having an exit face A2 running obliquely with respect to an exit face A1 of the second non-linear crystal X2(II). In conjunction with the optical unit or the prism P, the same advantages as already described in conjunction with the preceding exemplary embodiments result from the obliquely running exit face A2.

The converted portion $\lambda 1^*$ of the first wavelength $\lambda 1$ is vertically polarized, whereas the second wavelength $\lambda 2$ is horizontally polarized.

The frequency conversion arrangement may comprise a (polarizing) beam splitter S which is designed to mirror out the (vertically polarized) converted portion $\lambda 1^*$ of the first wavelength $\lambda 1^*$ from the beam path.

Specifically at high performance, this has the advantage, that the second non-linear crystal is not permanently exposed to unnecessary load, which would accelerate a degradation of the crystal.

The beam splitter S is further designed for transmitting the unconverted (horizontally polarized) portion of the first wavelength $\lambda 1$.

The beam splitter S may be formed, for example, as a beam splitter cube.

After the beam splitter S, the first and the second wavelengths each have a horizontal polarization.

The frequency conversion arrangement further comprises a second $\lambda/2$ wave plate HWP2 disposed between the first non-linear crystal X1(I) and the second non-linear crystal X2(II) (after the beam splitter S).

The second wave plate HWP2 is designed so as to influence the polarization of the first wavelength $\lambda 1$ (according to the rotation thereof) and to leave the polarization of the second wavelength $\lambda 2$ uninfluenced.

By means of the second wave plate HWP2, the polarization of the first wavelength λ1 (or the portion of the first wavelength remaining within the beam path) may be adjusted for a mixing process of type II for generating the third harmonic in the second non-linear crystal X2(II).

Subsequently, the first wavelength λ1 and the second wavelength λ2 are superimposed in the second non-linear crystal X2(II) for generating the third wavelength λ3.

In an alternative of this exemplary embodiment, the use of the beam splitter S may be renounced of.

In this case, a converted (vertically polarized) portion λ1* of the first wavelength λ1 remains within the beam path, however, its polarization is rotated by the second wave plate HWP2 such that this portion is not involved in generating the third wavelength.

In this case, the polarization of the unconverted portion of the first wavelength λ1 is rotated at the same time such that the unconverted portion of the first wavelength λ1 is used for generating the third wavelength λ3.

A further exemplary embodiment of the frequency conversion arrangement, in which the second non-linear crystal is formed as a crystal of type I, will be described in conjunction with FIG. 7.

The exemplary embodiment of the frequency conversion arrangement shown in FIG. 7 substantially corresponds to the embodiment previously described in conjunction with FIG. 6.

However, due to the phase adaptation of type I, the second wave plate HWP2 in the second non-linear crystal X2(II) is omitted.

As previously described in conjunction with FIG. 6, the converted portion of the first wavelength may be mirrored out by means of the beam splitter S.

After the beam splitter S, the first and the second wavelengths after the beam splitter S each have a horizontal polarization.

This has the advantage that no further (second) wave plate needs to be used, since the polarizations of the involved wavelengths are already adapted to the required polarizations for a phase adaptation of type I in the second non-linear crystal X2(II).

The use of a crystal of type I for generating the third wavelength λ3 (the third harmonic) results in advantages with respect to the conversion efficiency, basically, however, in a reduced symmetry of the beam profile of the third wavelength λ3—this can be compensated for, however, by suitably selecting the prism P and/or the angle of the exit face A2 of the second non-linear crystal X2(II).

In this exemplary embodiment as well, in an alternative, the use of the beam splitter S as described in conjunction with FIG. 6, can be renounced of.

It should be pointed out at this point that all of the parts described above taken alone or in any combination, in particular of the details illustrated in the drawings, are claimed as being substantial to the invention.

LIST OF REFERENCE NUMERALS 100 frequency conversion arrangement
200 system for frequency conversion
Λ1 (beam of the) first wavelength
Λ2 (beam of the) second wavelength
Λ3 (beam of the) third wavelength
P optical unit
X1 first non-linear crystal
X2 second non-linear crystal
A1 entry face of the second non-linear crystal
A2 exit face of the second non-linear crystal
L laser system
B beam of the laser system
T beam profile size adaptation unit
K beam profile analysis unit
x1, x2, x3 first main axis of a beam profile
x1', x2', x3' influenced first main axis of a beam profile
y1, y2, y3 second main axis of a beam profile
S beam splitter
HWB1, HWP2 wave plates (L/2 plates)
X1(I) first non-linear crystal, type I
X2(I) second non-linear crystal, type I
X2(II) second non-linear crystal, type II

The invention claimed is:

1. A frequency conversion arrangement (100) for optimizing properties of a harmonic of a laser, in particular a beam profile and/or a long-term stability,
wherein the arrangement comprises:
a first non-linear crystal (X1), which is designed in such a way as to convert a first wavelength (λ1) partially into a second wavelength (λ2); and
an optical unit, which in particular comprises at least one prism (P), which is designed in such a way as to influence the main axes of the beam profiles of the first wavelength (λ1) and/or the second wavelength (λ2) differently; and
a second non-linear crystal (X2), which is designed in such a way as to generate a third wavelength (λ3) from the unconverted part of the first wavelength (λ1) and/or the second wavelength (λ2),
the second non-linear crystal (X2) having an entry face (A1) and an exit face (A2), and the exit face (A2) running obliquely to the entry face (A1),
characterized in that
the optical unit comprises at least one prism (P), which is rotatable about at least one axis so as to influence the respective main axes (x1, y1, x2, y2) of the beam profiles differently.

2. The frequency conversion arrangement (100) according to claim 1,
characterized in that
the second wavelength (λ2) is the second harmonic of the first wavelength (λ1).

3. The frequency conversion arrangement (100) according to claim 1,
characterized in that
the third wavelength (λ3) is a wavelength corresponding to the second harmonic of the first wavelength (λ1) or the second harmonic of the second wavelength (λ2) or the sum or difference frequency of the first wavelength (λ1) and/or the second wavelength (λ2).

4. The frequency conversion arrangement (100) according to claim 1,
characterized in that
the exit face (A2) of the second non-linear crystal (X2) is substantially disposed in a Brewster arrangement.

5. The frequency conversion arrangement (100) according to claim 4, characterized in that the exit face (A2) of the second non-linear crystal (X2) is substantially disposed in a Brewster arrangement with respect to the third wavelength (λ3).

6. The frequency conversion arrangement (100) according to claim 1,
characterized in that
the exit face (A2) of the second non-linear crystal is uncoated.

7. The frequency conversion arrangement (100) according to claim 1,
characterized in that
the exit face (A2) of the second non-linear crystal is coated.

8. The frequency conversion arrangement (100) according to claim 7,
characterized in that
the exit face (A2) of the second non-linear crystal is coated with an antireflection coating for the first wavelength (λ1) and/or the second wavelength (λ2) and/or the third wavelength (λ3) and/or a p coating.

9. The frequency conversion arrangement (100) according to claim 1,
characterized in that
the exit face (A2) of the second non-linear crystal is nanostructured.

10. A system (200) for frequency conversion of a laser, comprising:
a frequency conversion arrangement (100) according to claim 1;
a laser system (L) generating a beam (B) having the first wavelength (21); and
a beam profile size adaptation unit (T), which is designed such as to adapt the size of the beam profile of the beam (B);
wherein the beam profile, after the adaptation of the size by the beam profile size adaptation unit (T), is supplied to the frequency conversion arrangement (100).

11. The system (200) according to claim 10,
characterized in that
the size of the beam profile of the beam (B) before the frequency conversion arrangement, has a diameter of at least 250 μm.

12. The system (200) according to claim 11,
characterized in that
the size of the beam profile of the beam (B) before the frequency conversion arrangement, has a diameter of at least 500 μm.

13. The system (200) according to claim 11,
characterized in that
the size of the beam profile of the beam (B) before the frequency conversion arrangement, has a diameter of at least 1,000 μm.

14. The system (200) according to claim 10,
characterized in that
the laser system (L) is a pulsed laser system preferably having pulse durations in the microsecond range, further preferred in the nanosecond range, still further preferred in the picosecond range.

15. The system (200) according to claim 14,
characterized in that
the laser system (L) is a pulsed laser system having pulse durations in the microsecond range.

16. The system (200) according to claim 14,
characterized in that
the laser system (L) is a pulsed laser system having pulse durations in the nanosecond range.

17. The system (200) according to claim 14,
characterized in that
the laser system (L) is a pulsed laser system having pulse durations in the picosecond range.

18. The system (200) according to claim 10,
characterized in that
the laser system (L) is a continuous beam laser system.

19. A frequency conversion arrangement (100) for optimizing properties of a harmonic of a laser, in particular a beam profile and/or a long-term stability,
wherein the arrangement comprises:
a first non-linear crystal (X1), which is designed in such a way as to convert a first wavelength (λ1) partially into a second wavelength (λ2); and
an optical unit, which in particular comprises at least one prism (P), which is designed in such a way as to influence the main axes of the beam profiles of the first wavelength (λ1) and/or the second wavelength (λ2) differently; and
a second non-linear crystal (X2), which is designed in such a way as to generate a third wavelength (λ3) from the unconverted part of the first wavelength (λ1) and/or the second wavelength (λ2),
the second non-linear crystal (X2) having an entry face (A1) and an exit face (A2), and the exit face (A2) running obliquely to the entry face (A1),
characterized in that
a/the prism (P) of the optical unit is transversely translatable so as to adjust and/or compensate for a runtime difference (Δt) between the first wavelength (λ1) and the second wavelength (λ2) continuously.

20. A frequency conversion arrangement (100) for optimizing properties of a harmonic of a laser, in particular a beam profile and/or a long-term stability,
wherein the arrangement comprises:
a first non-linear crystal (X1), which is designed in such a way as to convert a first wavelength (λ1) partially into a second wavelength (λ2); and
an optical unit, which in particular comprises at least one prism (P), which is designed in such a way as to influence the main axes of the beam profiles of the first wavelength (λ1) and/or the second wavelength (λ2) differently; and
a second non-linear crystal (X2), which is designed in such a way as to generate a third wavelength (λ3) from the unconverted part of the first wavelength (λ1) and/or the second wavelength (λ2),
the second non-linear crystal (X2) having an entry face (A1) and an exit face (A2), and the exit face (A2) running obliquely to the entry face (A1),
characterized in that
the optical unit is coordinated, in particular by an apex angle and a material of the prism (P), to the obliquely running exit face (A2) of the second non-linear crystal (X2), such as to generate a rotationally symmetrical beam profile for the third wavelength (λ3), in particular independent of the symmetry of the beam profile of the first wavelength (λ1) and/or the second wavelength (λ2).

21. A system (200) for frequency conversion of a laser, comprising:
a frequency conversion arrangement (100) for optimizing properties of a harmonic of the laser, in particular a beam profile and/or a long-term stability,
wherein the arrangement comprises:
a first non-linear crystal (X1), which is designed in such a way as to convert a first wavelength (λ1) partially into a second wavelength (λ2); and
an optical unit, which in particular comprises at least one prism (P), which is designed in such a way as to influence the main axes of the beam profiles of the first wavelength (λ1) and/or the second wavelength (λ2) differently; and a second non-linear crystal (X2), which is designed in such a way as to generate a third wavelength (λ3) from the unconverted part of the first wavelength (λ1) and/or the second wavelength (λ2), the second non-linear crystal (X2) having an entry face (A1) and an exit face (A2), and the exit face (A2) running obliquely to the entry face (A1);

a laser system (L) generating a beam (B) having the first wavelength (λ1); and a beam profile size adaptation unit (T), which is designed such as to adapt the size of the beam profile of the beam (B);

wherein the beam profile, after the adaptation of the size by the beam profile size adaptation unit (T), is supplied to the frequency conversion arrangement (100), characterized by a beam profile analysis unit (K) for measuring the dimensions of the respective main axes (x1, y1, x2, y2, x3, y3) of the respective beam profile of the first wavelength (λ1) and/or the second wavelength (λ2) and/or the third wavelength (λ3), wherein the beam profile analysis unit (K) in particular comprises at least one camera and/or an $M^2$ analysis unit.

22. A frequency conversion method, for optimizing properties of a harmonic of a laser, in particular a beam profile and/or a long-term stability, wherein the method comprises the following steps:

a first conversion step, in which a first wavelength (λ1) is partially converted into a second wavelength (λ2) in a first non-linear crystal (X1), a beam profile adaptation step, in which the beam profiles of the first wavelength (λ1) and/or the second wavelength (λ2) are influenced in their respective main axes (x1, y1, x2, y2) differently, a second conversion step, in which a third wavelength (λ3) is generated from the non-converted part of the first wavelength (λ1) and/or the second wavelength (λ2) in a second non-linear crystal (X2), wherein the second non-linear crystal (X2) has an entry face (A1) and an exit face (A2), and the exit face (A2) running obliquely to the entry face (A1), wherein the beam profile adaptation step is performed by rotating at least one prism (P) about at least one axis.

23. The frequency conversion method according to claim 22, comprising a step for adjusting an intensity of a portion of the first wavelength (λ1) involved in the first and/or the second conversion step.

24. A frequency conversion method for optimizing properties of a harmonic of a laser, in particular a beam profile and/or a long-term stability, wherein the method comprises the following steps:

a first conversion step, in which a first wavelength (λ1) is partially converted into a second wavelength (λ2) in a first non-linear crystal (X1), a beam profile adaptation step, in which the beam profiles of the first wavelength (λ1) and/or the second wavelength (λ2) are influenced in their respective main axes (x1, y1, x2, y2) differently, a second conversion step, in which a third wavelength (λ3) is generated from the non-converted part of the first wavelength (λ1) and/or the second wavelength (λ2) in a second non-linear crystal (X2), wherein the second non-linear crystal (X2) has an entry face (A1) and an exit face (A2), and the exit face (A2) running obliquely to the entry face (A1), wherein an aspect ratio of the beam of the third wavelength (λ3) is continuously adjustable by the beam profile adaptation step.

* * * * *